A. MARCHAND.
ANIMAL TRAP.
APPLICATION FILED NOV. 16, 1908.
947,250.
Patented Jan. 25, 1910.
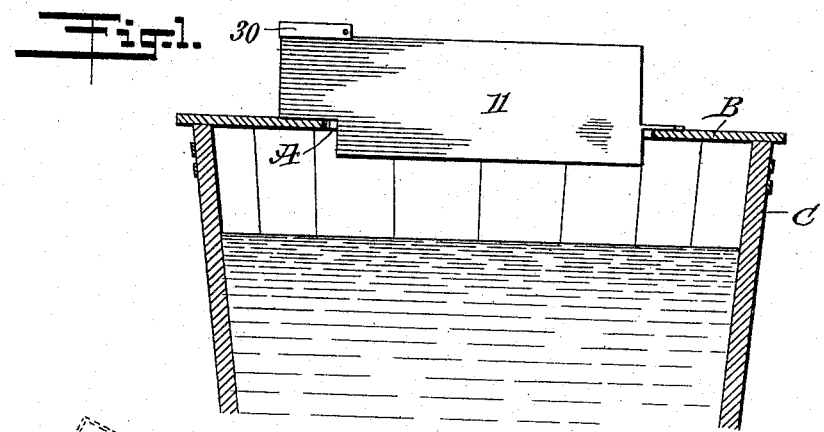
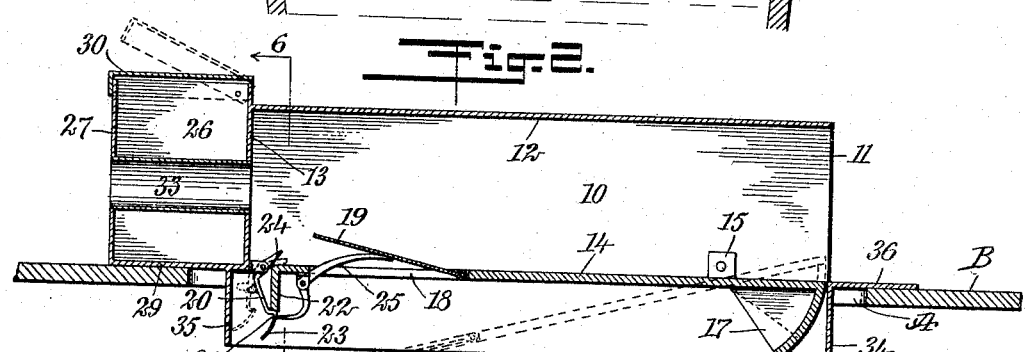
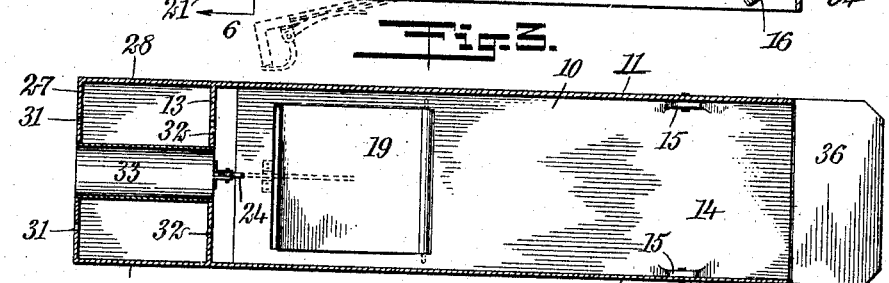
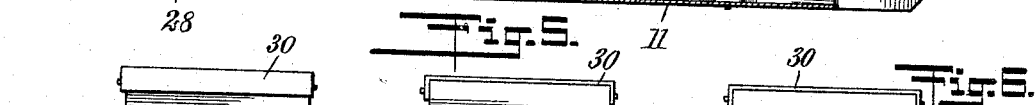
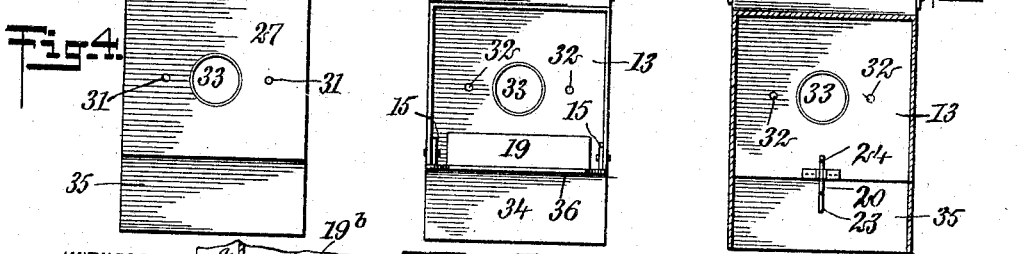
WITNESSES
INVENTOR.
Alexis Marchand
BY
ATTORNEYS

UNITED STATES PATENT OFFICE.

ALEXIS MARCHAND, OF BRIDGEPORT, WASHINGTON.

ANIMAL-TRAP.

947,250.  Specification of Letters Patent.  Patented Jan. 25, 1910.

Application filed November 16, 1908. Serial No. 462,789.

*To all whom it may concern:*

Be it known that I, ALEXIS MARCHAND, a citizen of the United States, and a resident of Bridgeport, in the county of Douglas and State of Washington, have invented a new and Improved Animal-Trap, of which the following is a full, clear, and exact description.

This invention relates to certain improvements in animal traps, and more particularly to that type of trap in which the platform or floor upon which the animal stands, is liberated by suitable trigger mechanism, so that the platform or floor swings downwardly to leave the animal in a separate lower compartment, which, if desired, may contain water in which the animal is drowned. Various forms of traps of this character have been designed, and in some of these there has been provided an open-ended chamber having means for supporting bait adjacent the inner end of the chamber, and having the floor of the trap formed of a main pivoted section and a smaller trigger section carried thereby.

One of the main objects of my invention is to provide an improved floor or platform in which the main section is hinged adjacent the open end of the chamber, and in which the trip or trigger section is also hinged at the edge thereof toward the open end of the chamber, so that the animal in traveling into the chamber will encounter no obstacle or obstruction in passing from the main section to the trigger section.

A further object of the invention is to provide certain improvements in the locking mechanism, for firmly holding the main section in position until it is released by the operation of the trigger section.

A further object of the invention is to so support the bait that the odor thereof may readily escape, yet the animal cannot reach the bait either from the inside or the outside of the trap.

A further object is to so construct the trap that it may be readily placed in an aperture in the cover of a bucket, barrel or box, and its accidental removal or lateral displacement will be prevented.

Reference is to be had to the accompanying drawings, forming a part of this specification, in which similar characters of reference indicate corresponding parts in all the figures, and in which—

Figure 1 is a side elevation of a trap constructed in accordance with my invention and supported upon a vessel, a portion of which is broken away; Fig. 2 is a vertical longitudinal section through the trap; Fig. 3 is a horizontal section; Fig. 4 is an end view of the closed end of the trap; Fig. 5 is an end view of the open end of the trap; Fig. 6 is a transverse section on the line 6—6 of Fig. 2; and Fig. 7 is a view similar to a portion of Fig. 2, but showing a slightly modified form of trigger mechanism.

My improved trap is provided with a chamber 10, into which the animal to be captured may enter, said chamber having oppositely-disposed substantially parallel side walls 11, a top wall 12, and an inner end wall 13. The floor of this chamber includes a pivoted platform or section 14, constituting a trip door and having locking mechanism for normally supporting it at its inner free end, so that a mouse or other animal in stepping upon the body of the floor or section will not depress the same. The section 14 is of a width substantially equal to the width of the chamber, and adjacent the entrance end of the chamber it is provided with upwardly-extending lugs 15 pivoted to the side walls 11. Intermediate the open end of the chamber and the lugs 15, the section carries a downwardly and inwardly-curved wall 16, all portions of which are of equal distances from the pivots extending through the lugs 15. At the side edges of the section 14, the curved wall 16 is connected by sector-shaped plates 17, and these plates, together with the curved wall 16, constitute a weight for counterbalancing the weight of the remaining portion of the section, and returning the section to its normal position after it has been depressed by an animal. The curved wall and the side plates serve not only as a counterbalancing weight, but also serve to close the communication between the space below the section and the chamber 10 at the open end of said chamber, when said section is depressed. I thus positively prevent any animal previously caught and deposited in the lower chamber, from escaping beneath the front end of the section 14, when the inner end is depressed during the capture of a second animal. The main section 14 of the movable floor or platform is provided with an aperture 18 therein adjacent its inner end, and a second platform section 19 is pivoted at the side of this opening which is nearest to the entrance opening of the chamber 10. The section 19 normally inclines upwardly toward its outer end and lies at a slight angle to the main section, but the two sections are connected together at the inner end of the section 19, so that no obstruction or resistance is encountered by the animal in entering the trap.

Within the chamber 10 and pivoted adjacent the lower edge of the end wall 13, is a catch or lever 20 which normally supports the section 14 and prevents it from swinging downwardly while the animal is entering the trap. This catch has a hook portion 21 for engagement beneath a downwardly-turned flange 22 on the section 14, and below this hook portion is a rearwardly-curved terminal portion 23, the purpose of which will be hereinafter set forth. The catch terminates at its upper end and above its pivot in a forwardly-extending lug or stud 24, for limiting the upward movement of the section 14 and swinging the catch into operative position. Pivoted to the under side of the section 14 is a bell crank lever 25, one end of which normally engages with and supports the trigger section 19 intermediate the ends of the latter, and the other end of which engages with the lever 20 adjacent the catch portion 21. As the animal enters the chamber 10, he may safely pass over the major portion of the section 14 until he steps upon the section 19. A downward movement of the section 19 swings the bell crank lever 25 to force the catch 21 from beneath the flange 22, and both sections then swing downwardly as shown in dotted lines in Fig. 2. As soon as the animal slips off the section into the lower chamber or compartment, and the platform or floor of the section 10 is relieved of the weight of the animal, said floor or platform swings upwardly under the action of the weights 16 and 17 until the free end of the section strikes the forwardly-extending projection 24. The contact with this section swings the catch portion 21 into operative position, and the parts are locked in position ready for the advent of another animal.

In case the catch 21 should swing back to the position shown in solid lines in Fig. 2 before the section 14 has returned to the position shown in solid lines, then the engagement of the rear of the section with the curved portion 23 of the catch, will swing the latter out of the path of the rising section until after the section reaches its proper position and contacts with the projection 24 to return the catch into operation.

For storing the bait and preventing it from being eaten by the animals either before or after they are caught, I provide a bait chamber 26 formed by the end wall 13, a second end wall 27, extensions 28 of the side walls 11, a bottom 29 in alinement with the movable section 14, and a hinged cover 30. The end wall 27 is provided with a plurality of apertures 31 through which animals on the exterior of the trap may smell the bait, and the end wall 13 is also provided with similar openings 32, which serve to induce the animal to enter the chamber 10. Extending through the bait compartment but out of communication with the interior thereof, is a central passage 33 in axial alinement with the chamber 10 and serving not only for the admission of light to the inner end of the chamber, but also permitting the mouse while entering the chamber to face the light and have his attention distracted from any unevenness or irregularity in the floor, which might otherwise cause him to become suspicious. The bait compartment may be readily re-filled or cleaned by raising the hinged closure 30.

The side walls 11 of the chamber 10 extend a considerable distance below the floor 14, and the portions of these side walls below said floor may connect by end wall portions 34 and 35. The portions of the trap below the floor 14 are adapted to extend down into an aperture A in the top wall B of any suitable form of container or lower chamber C, as illustrated particularly in Figs. 1 and 2. The weight of the trap is supported by the engagement of the bottom wall 29 of the bait compartment at one end and by a laterally-extending flange or plate 36 at the opposite or entrance end. This flange or plate is rigidly connected to the downwardly-extending wall 34 and is in alinement with the movable section 14.

One of the main features of the specific form of trap illustrated in Fig. 2, is the hinging of the main section 14 adjacent the entrance opening of the trap, in combination with the second section hinged to the main section at the edge toward the entrance opening. This feature may be embodied in a somewhat different form, as shown in Fig. 7. In this figure, the main section 14ᵃ carries a tripping section 19ᵇ hinged at the edge toward the entrance opening of the trap and having a downwardly-extending arm or flange 37 carrying a locking pin 38 and a counterbalancing lever 39. The lever 39 is rigid with the section 19ᵇ and extends toward the open end of the trap and its movement is restricted and controlled by an inclosing guide or staple 40. The locking pin 38 extends in a direction opposite to that of the arm 39 and is guided by the downwardly-extending flange 22ᵃ of the main section. The end wall 13ᵃ of the chamber is provided with a downwardly-extending flange or tongue 41, having an aperture into which the locking pin 38 may enter to normally hold the platform in position. As the animal steps on the section 19ᵇ, the free edge of the latter is swung downwardly to counterbalance the arm 39 and the pin 38 is withdrawn to permit the downward movement of both floor sections.

Having thus described my invention, I claim as new and desire to secure by Letters Patent:

1. An animal trap, including a chamber having an open end, a floor hinged adjacent the open end and having an opening therein, a platform for closing said opening and hinged to the floor at the end of the opening toward the open end of the chamber, a pivoted catch adjacent the free end of the floor, having a hook portion for engagement beneath the edge of the floor and an outwardly-curved terminal portion for moving said hook portion out of the path of the floor during the upward movement of the latter, a forwardly-extending lug or stud carried by said catch and in the path of the floor to limit the upward movement of the latter and return the catch into operative position beneath the floor, and a bell crank lever pivoted to the under side of said floor adjacent the free end thereof and having one arm thereof in engagement with the under surface of said platform and having the other arm thereof in operative engagement with said catch.

2. An animal trap, including a floor section pivoted at one end, a pivoted catch adjacent the opposite end of said floor and having a hook portion for engagement beneath the edge of the floor and an outwardly curved terminal portion for moving said hook portion out of the path of the floor during the upward movement of the latter, a lever pivoted to the under side of said floor adjacent the free end thereof and having one arm thereof adjacent the catch and operating to push the latter from beneath the floor, and a platform carried by said floor and movable in respect thereto and in engagement with the other arm of said lever.

3. An animal trap, including a chamber having sheet metal walls and top and having one open end, a floor hinged adjacent the open end, a bait box constituting a closure for the opposite end of said chamber, said bait box having a closure for the top thereof, an open-ended tube extending through said bait box and out of communication with the interior thereof and in general alinement with the chamber, said bait box having openings through the wall which separates said bait box from said chamber, means adjacent the lower edge of said wall for normally supporting said floor, and means for withdrawing said supporting means.

In testimony whereof I have signed my name to this specification in the presence of two subscribing witnesses.

ALEXIS MARCHAND.

Witnesses:
 CLAIR W. FAIRBANK,
 JOHN P. DAVIS.